United States Patent
Chew

(10) Patent No.: US 6,389,560 B1
(45) Date of Patent: *May 14, 2002

(54) UNIVERSAL SERIAL BUS INTERPRETER

(75) Inventor: Michael N. Chew, San Jose, CA (US)

(73) Assignee: Sun Microsystems, Inc., Palo Alto, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/232,983

(22) Filed: Jan. 19, 1999

(51) Int. Cl.$^7$ ............................................... H02H 3/05
(52) U.S. Cl. ........................... 714/43; 714/44; 710/99
(58) Field of Search ............................. 714/40, 43, 44, 714/56; 710/17, 19

(56) References Cited

U.S. PATENT DOCUMENTS

| | | | | |
|---|---|---|---|---|
| 5,859,993 A | * | 1/1999 | Snyder | 712/208 |
| 5,974,486 A | * | 10/1999 | Siddappa | 710/53 |
| 6,012,103 A | | 1/2000 | Sartore et al. | |
| 6,044,428 A | * | 3/2000 | Rayabhari | 710/129 |
| 6,098,120 A | | 8/2000 | Yaotani | |
| 6,101,076 A | * | 8/2000 | Tsai | 361/90 |
| 6,105,097 A | | 8/2000 | Larky et al. | |
| 6,119,194 A | | 9/2000 | Miranda et al. | |
| 6,157,975 A | * | 12/2000 | Brief | 710/104 |
| 6,170,062 B1 | | 1/2001 | Henrie | |
| 6,178,514 B1 | | 1/2001 | Wood | |
| 6,185,569 B1 | | 2/2001 | East et al. | |
| 6,202,103 B1 | * | 3/2001 | Vonbank | 710/15 |
| 6,219,736 B1 | * | 4/2001 | Klingman | 710/129 |

FOREIGN PATENT DOCUMENTS

JP 11-87597 * 10/2000

OTHER PUBLICATIONS

Borriello, Gaetano et al. "Interface Synthesis: a vertical slice from didgital to software components", ACM 1998 1–58113–008 Feb. 1998.*

Breevoort, C.M. "A Multi–services Communications Architecture For In–home USB and IEEE–1394 Based Devices" IEEE 1998.*

Adams et al, "Conformance Testing of VMEbus and Multibus II Products," IEEE Micro, vol. 12, No. 1, Feb. 1992, pp. 57–64.

Zelms, "On–Line Diagnosis of Peripherals in a Minicomputer System," Proceedings of the National Electronics Conference, Oct. 1980, pp. 545–550.

(List continued on next page.)

*Primary Examiner*—Robert Beausoleil
*Assistant Examiner*—Bryce P. Bonzo
(74) *Attorney, Agent, or Firm*—Conley, Rose & Tayon, PC; B. Noël Kivlin

(57) ABSTRACT

A system and method for testing the conformance of a universal serial bus (USB) system to a set of predefined USB Specifications. One embodiment of the system comprises a USB interpreter that can be used to selectively examine device data, execute USB commands and exercise USB functions without having to create or compile a test program. The USB interpreter comprises a test application and a test application driver. The test application driver interfaces with the USB system software. The USB system software may include a USB driver, a host controller driver and other host software. The USB driver interfaces with the test application through the test application driver. The host controller driver interfaces with the host controller and thereby interfaces the software on the host system with the USB interconnect and USB devices. In one embodiment, the USB interpreter incorporates a command line interpreter through which a user can enter commands to perform specific operations and tests on the USB system. The user may execute commands in an operating system (e.g., Unix) shell without having to interrupt a USB testing or debugging session. The user may also enter commands and perform USB system testing remotely via a communications link between the user and the system's host computer.

29 Claims, 6 Drawing Sheets

OTHER PUBLICATIONS

Universal Serial Bus Specification Revision 1.0, Jan. 1996, pp. 2–9, 165–172.

Dreitlein, "The Challenge of Testing SCSI Peripherals," Electronics Test, vol. 13, No. 6, Jun. 1990, 4 pgs.

European Search Report, Application No. 00 30 0324, mailed Jul. 26, 2000.

"Universal Host Controller Interface (UHCI) Design Guide; Revision 1.1", Intel Corporation, Mar. 1996.

* cited by examiner

UNIVERSAL SERIAL BUS INTERPRETER

BACKGROUND OF THE INVENTION

1. Field of the Invention

The invention relates generally to computer systems and more particularly to methods and devices for testing the functional compatibility of peripheral devices with a universal serial bus.

2. Description of the Relevant Art

Since the advent of personal computers, computer users have been eager to expand the capabilities of their machines. Users, however, have experienced innumerable difficulties when confronted with the task of connecting peripheral devices to their computers. While it may be simple for a user to attach a printer to his or her computer, the connection of a device (e.g., a scanner) to a serial port presents more of a challenge. The installation of equipment internal to the computer, such as an interface card for a scanner, may present even greater difficulties, as the user may face problems in setting I/O and DMA addresses for resolving IRQ conflicts. These difficulties can frustrate the user, particularly when they cause the computer to operate incorrectly or simply fail to operate at all.

With the rapid advances in the state of computer technology, the potential for experiencing such difficulties has grown. There have, as a result, been attempts to alleviate these problems. For example, the concept of designing plug-and-play peripheral devices was intended to alleviate difficulties of installing the devices. This concept, however, is directed primarily toward devices which are installed inside the cabinet of the computer. The installation of external peripheral devices, such as printers and scanners, is still likely to be accompanied by some of the difficulties targeted by the plug-and-play concept.

Another attempt to eliminate some of the problems attendant to the installation of peripheral devices was the introduction of PC-Card technology. (This technology was formerly termed PCMCIA—Personal Computer Memory Card International Association.) PC-Card (PCMCIA) peripheral devices are simply and easily inserted into a PC-Card socket and are recognized by the computer. The problem with this technology, however, was that it was originally targeted to portable computers. Although a PC-Card (PCMCIA) slot can be installed in a desktop computer, this solution simply has not been widely adopted. Thus, there remained a need for a simple and convenient plug-and-play type technology for desktop computers.

SUMMARY OF THE INVENTION

One or more of the problems outlined above may be solved by various embodiments of the system and method of the present invention. In response to the continuing difficulties in installing peripheral devices and the need for a solution to the problem, the idea of a universal serial bus (USB) was developed. The development of the USB was motivated by number of factors, including the difficulty of adding peripheral devices and the lack of additional ports for installing these devices. The USB is designed to provide plug-and-play capabilities for external peripheral devices which are connected to the I/O ports of the computer and thereby reduce the difficulties experienced by many users. The USB was also designed to provide means for installing numerous devices rather than restricting the user to one or two (one for each port on a computer which does not have a USB).

The implementation of plug-and-play capabilities through the USB is not solely dependent upon the USB. It is fundamental that the peripheral devices to be installed on the USB must be compatible with the USB. In other words, it is necessary that the devices conform to the specific characteristics of the USB. This is ensured in part by the propagation of the USB Specification, which defines these characteristics. The USB Specification is hereby incorporated herein by reference in its entirety. The designs of peripheral devices can be checked prior to manufacture through device simulations. Such verification of device designs, however, may themselves contain errors. Additionally, errors may be introduced in translation of the design into a physical device. It is therefore important to have means for verifying different aspects of USB compatibility of peripheral devices in their final physical configurations. It is also important to have means for verifying USB system functions apart from the peripheral devices. The various embodiments of the invention provide such means.

One embodiment of the invention comprises a USB interpreter. The USB interpreter is a software tool that can be used in a USB system to selectively examine device data, execute USB commands and exercise USB functions. The USB interpreter can perform these functions without having to create or compile a test program and can therefore be very useful in debugging devices with respect to USB compliance. The USB interpreter can also be used in the development of USB software.

The USB interpreter comprises a test application and a test application driver. The test application driver interfaces with the USB system software. The USB system software, which may include a USB driver, a host controller driver and other host software, is sometimes referred to as the USB framework support. The USB driver interfaces with the test application through the test application driver. The host controller driver interfaces with the host controller, which in turn interfaces the software on the host system with the USB interconnect and USB devices.

In one embodiment, the USB interpreter incorporates a command line interpreter through which a user can enter commands to perform specific operations and tests on the USB system. The user may thereby avoid performing unnecessary tests on previously verified portions of the system. The use of the command line interpreter further allows the user to execute commands in an operating system (e.g., Unix) shell without having to interrupt a USB testing or debugging session. The use of the command line interpreter also allows the user to enter commands remotely (e.g., via a modem connected to the computer system) so that the expertise of a user who is not located at the site of the computer system.

BRIEF DESCRIPTION OF THE DRAWINGS

Other objects and advantages of the invention will become apparent upon reading the following detailed description and upon reference to the accompanying drawings in which.

Figure 1:
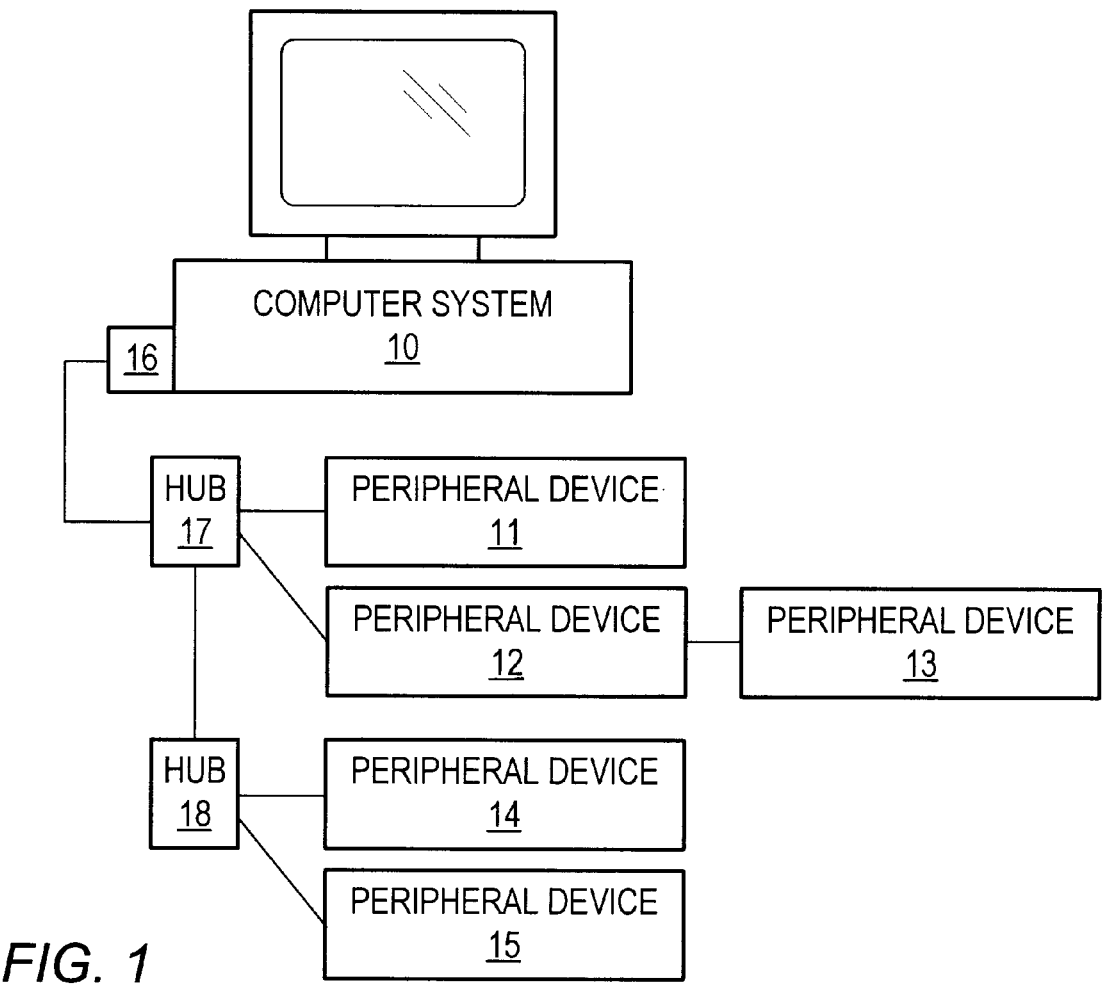
FIG. 1 is a block diagram illustrating the physical configuration of a plurality of USB peripheral devices attached to a computer system.

While the invention is susceptible to various modifications and alternative forms, specific embodiments thereof are shown by way of example in the drawings and will herein be described in detail. It should be understood, however, that the drawing and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

One embodiment of the invention is described below. In this embodiment, a host computer utilizes a USB system. The USB system includes a USB, a USB host controller coupled to the USB, a host controller driver for driving the host controller and a set of USB interfaces which allow communications between a test application and the host controller driver. The test application comprises a USB interpreter which is used to selectively test the functions of the USB system. Specifically, the application is configured to examine standard device descriptors, query USB devices using standard device requests and exercise individual USB interface functions. The USB interpreter allows the user to take these actions without having to first create and compile a test application. The USB interpreter thereby allows a user to selectively obtain information which facilitates debugging of USB devices and related software.

The development of the USB was motivated primarily by three considerations. First, personal computers have traditionally had limited flexibility in regard to reconfiguration of the computer. A number of advances were made in the areas of graphical user interfaces and internal bus architectures which made personal computers more user-friendly, but there was little progress in improving the connectivity of peripheral devices to desktop systems (despite the success of PC-Card plug-and-play peripherals in portable computers.) Second, personal computers typically had a limited number of ports to which peripheral devices could be connected. A typical system, for example, might have a single parallel port and one or two serial ports. Users were therefore prevented from having more than two or three peripheral devices corresponding to the two or three ports on their computers. Third, although there has been significant potential for computing and communication functions to benefit from each other, these technologies have evolved essentially independently so that the technologies were not easily merged. There was therefore a need for an easy and inexpensive means to communicate information via computers. The USB was designed to meet these needs.

Referring to FIG. 1, the USB is a bus designed to provide a simple and efficient method for connecting external peripheral devices to desktop computer systems. The figure shows a computer system 10 connected to several peripheral devices 11–15. The devices are connected to the USB port 16 on the computer system via hubs 17–18. The use of hubs 17–18 on the USB enables users to expand the number of devices which can be connected to the computer system (as compared to the two or three which could be directly connected to a non-USB system.) The system may also include compound devices 12 which serve as both hubs and functional devices. (Note that device 13 is connected to the USB via compound device 12.)

Figure 2:
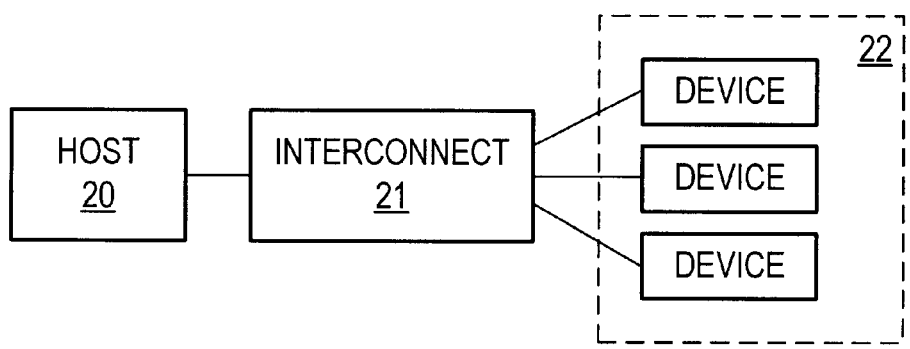
FIG. 2 is a block diagram illustrating the primary physical components of a USB system.

Referring to FIG. 2, a block diagram illustrating the primary physical components of a USB system is shown. The physical USB system can be described in three parts: a USB host 20; USB devices 22; and a USB interconnect 21. The first of these parts, the USB host, is the computer system which incorporates the USB root hub and forms the basis of the USB system. The second part, the USB devices, comprise the peripherals and functional devices which are to be connected to the computer system. USB "devices" may also refer to the hubs which can be connected to the USB to provide additional attachment ports. The third part, the USB interconnect, comprises the physical connections between the USB devices and the USB host, as well as the manner in which the devices communicate with host.

There is a single host associated with any USB system. The host is the computer system in which the USB system is implemented. The host incorporates a root hub of the USB which provides one or more attachment points for devices or other hubs. A host controller provides the interface between the host and the USB. The host controller may be implemented in one or a combination of hardware, firmware and software.

The USB devices are functional devices which provide capabilities to the system (e.g., an ISDN modem, a joystick or a set of speakers.) The USB devices may also be hubs which provide additional attachment points to the USB to which additional devices may be connected. (Non-hub devices are sometimes referred to as functions.) Some USB devices serve as both functional devices and hubs to which other devices can be attached. The USB Specification requires that all USB devices conform to certain interface standards and thereby ensures that the devices comprehend the USB protocol and respond to standard USB requests and commands.

Figure 3:
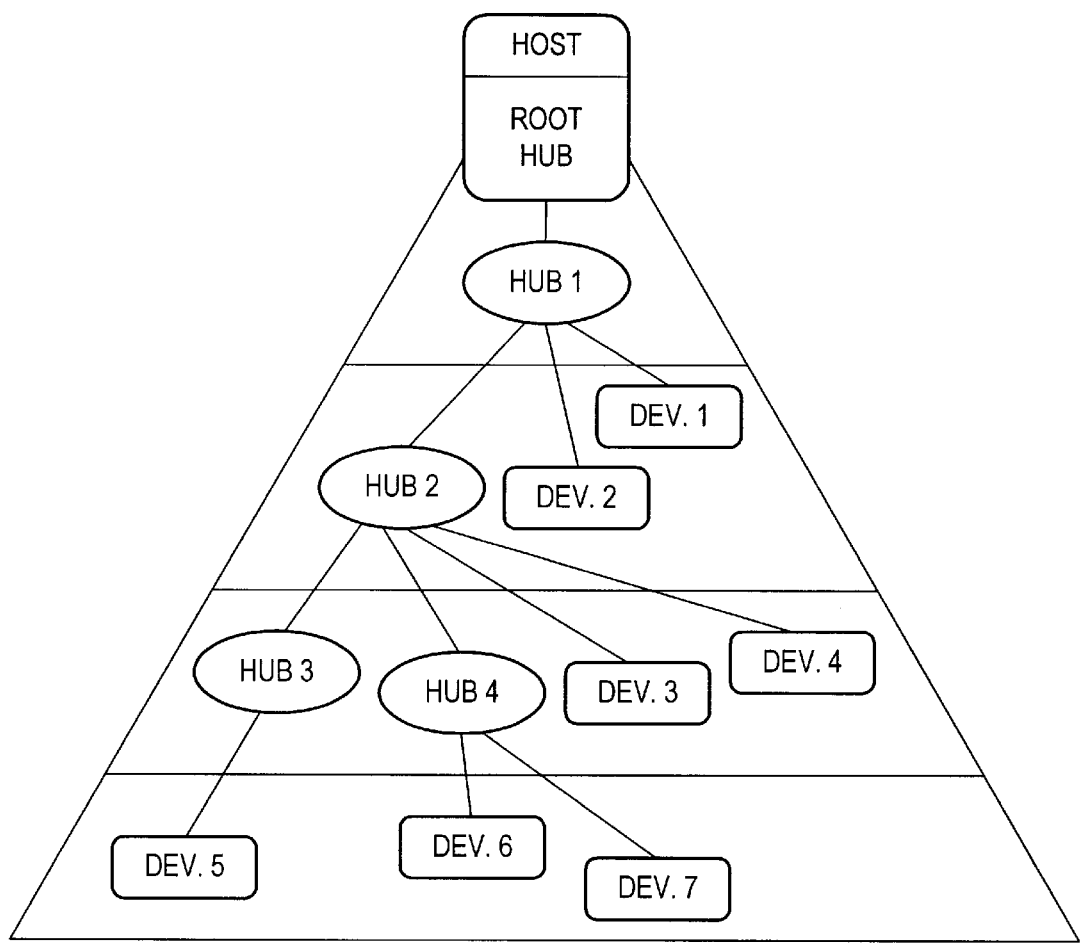
FIG. 3 is a block diagram illustrating the tiered star physical configuration of a plurality of devices connected to hubs on a USB interconnect.

The physical aspects of the USB interconnect are defined by the bus topology. (Although the bus topology includes non-physical aspects of the USB interconnect, they will be addressed elsewhere in this disclosure.) The bus topology describes the manner in which the USB connects USB devices with the USB host. Referring to FIG. 3, the physical configuration of the USB interconnect is that of a tiered star. The host has a root hub which forms the basis of the interconnect. Devices and/or additional hubs can be connected to the root and other hubs to form successive tiers of the interconnect. Thus, each hub forms the center of one of the stars in the tiered star configuration. Each wire segment in the interconnect is a point-to-point connection between the host or a hub and another hub or a device.

USB systems support "hot plugging". That is, USB devices may be attached to or removed from the USB at any time. The USB is designed to detect these changes in its physical topology and accommodate the changes in the available functions. All USB devices are connected to the USB at one of the hubs (either the root hub or one of the hubs chained from the root.) Attachment or removal of a device at a hub is indicated in the hub's port status. If a device is attached to the hub, the hub sends a notification to the host. The host then sends a query to the hub to determine the reason the notification was sent to the host. In response to this query, the hub sends the number of the port to which the device was attached to the host. The host then enables this port and begins communicating with the device via the control pipe (0 endpoint.) The host determines whether the attached device is a hub or a function and assigns a unique USB address to the device. The unique USB address and the 0 endpoint of the device are used as a control pipe for the device. If the newly attached device is a hub which already has devices attached to its ports, this same process is repeated for each of the attached devices. After a device has been attached and communications established between the device and the host, notifications are sent to interested host software.

If a device is removed from a hub, the hub disables the port to which the device had been attached and sends notification of the device's removal to the host. The host then removes the device and related data from any affected data structures. If the removed device is a hub to which other devices are attached, the removal process is repeated for each of the devices attached to the removed hub. Notifications are sent to interested host software indicating that the removed devices are no longer available.

Figure 4:
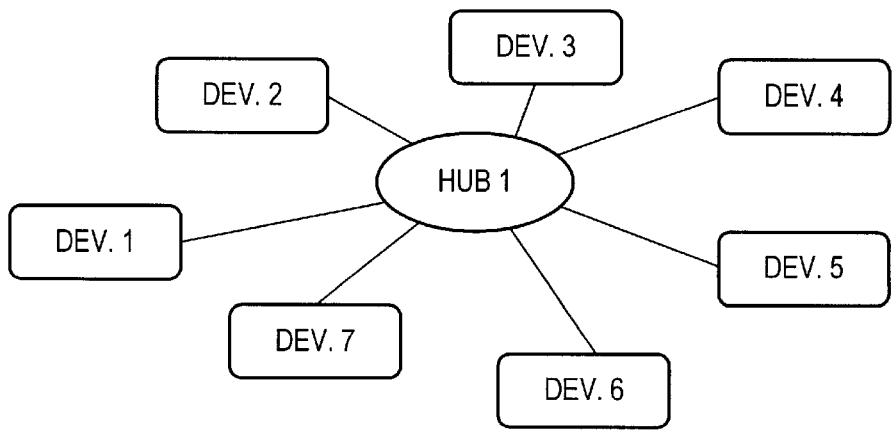
FIG. 4 is a block diagram illustrating the simple star logical configuration of a plurality of devices connected to a USB interconnect.

Although the physical topology of the USB interconnect is that of a tiered star configuration, the logical topology of the system is a simple star as shown in FIG. 4. Alternately, the logical configuration can be considered a series of direct connections between the individual USB devices and a client software application on the host. The logical relationship of the client software to the devices can also be thought of as one or more direct connections between the client software and the specific functions provided by the devices. While the view of the logical configuration as being a series of direct connections holds true for most operations, the system remains aware of the tiered physical topology so that devices downstream from a removed hub can be removed from the logical configuration when the hub is removed (see the discussion of hot-swapping above.)

Figure 5:
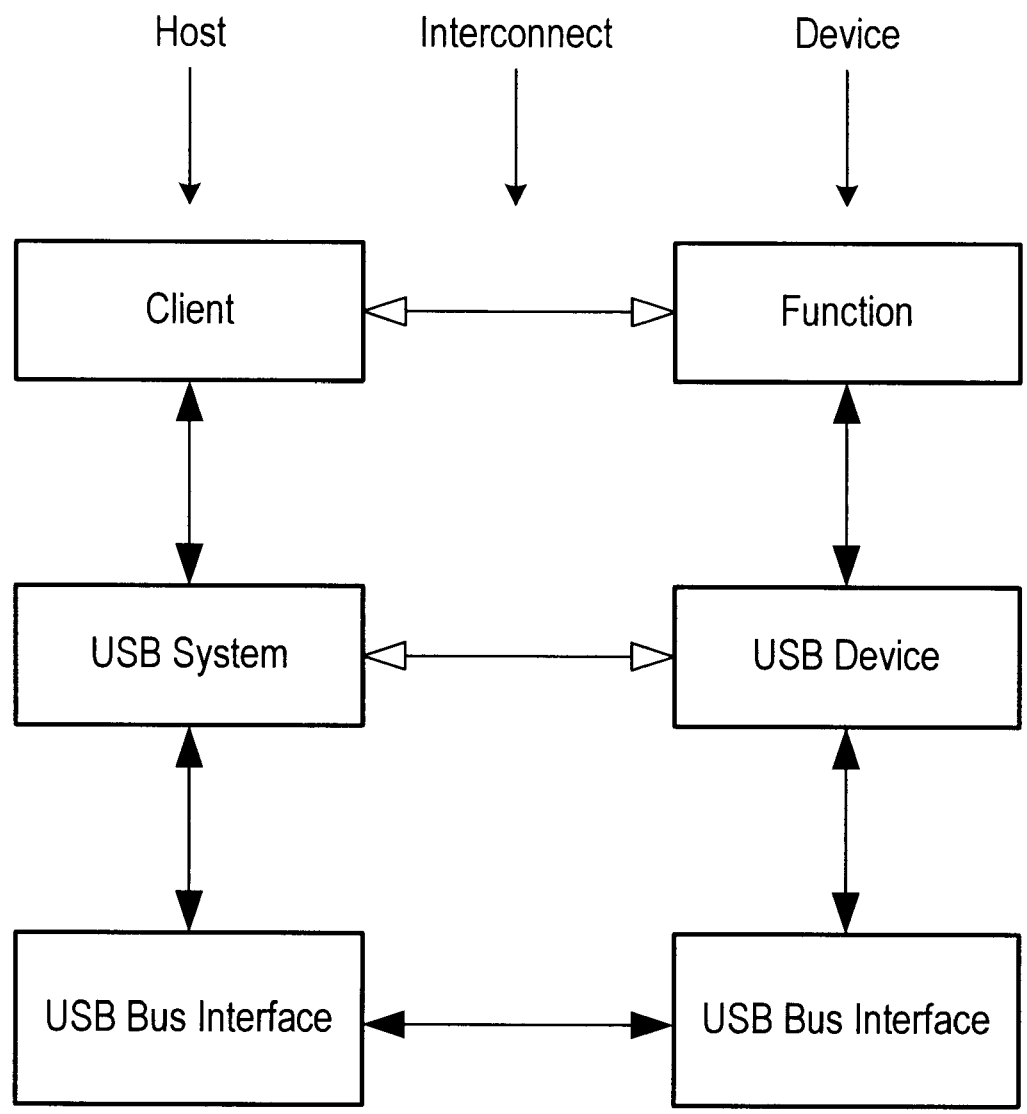
FIG. 5 is a functional block diagram illustrating the logical and physical flows of data within a USB system.
Figure 6:
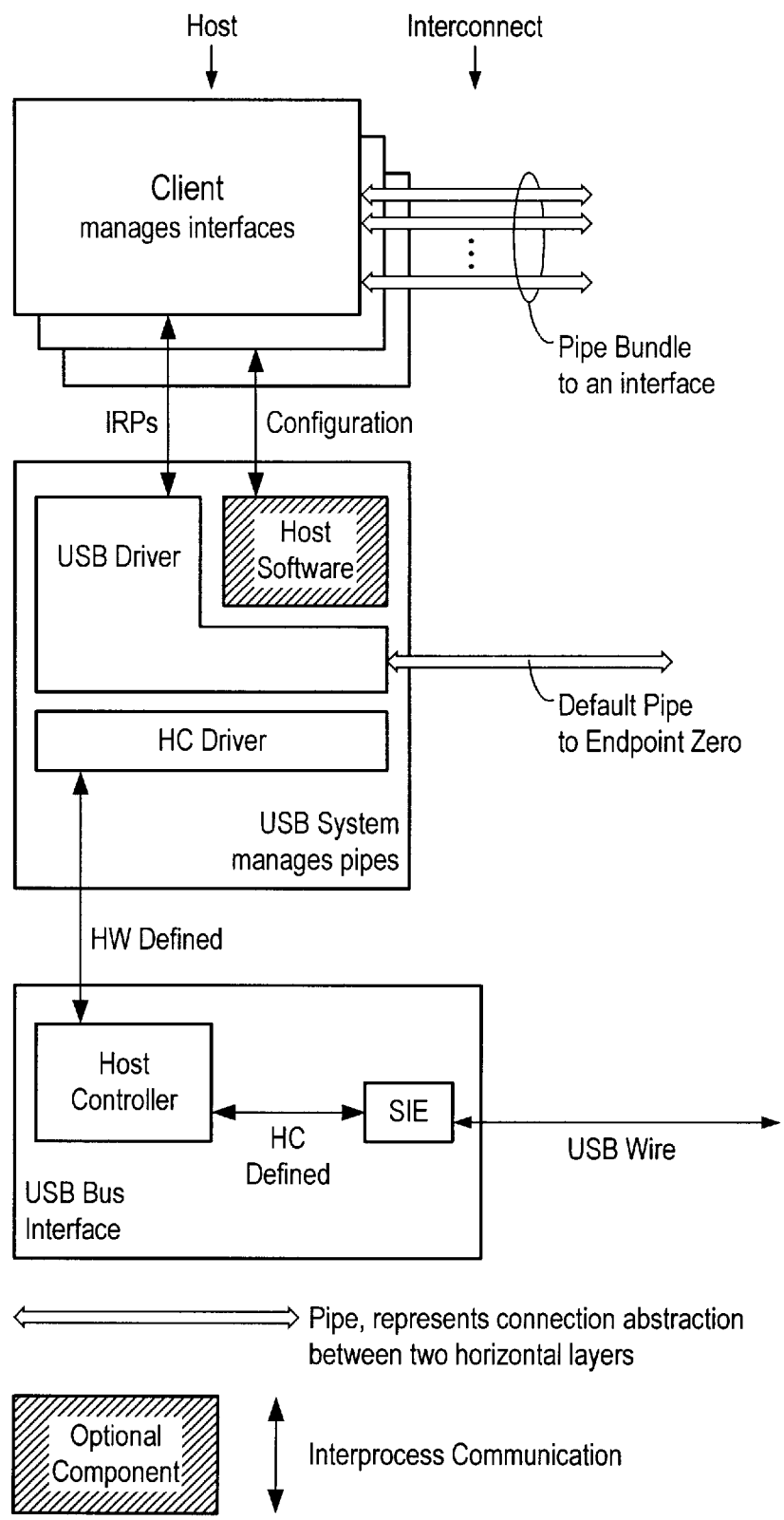
FIG. 6 is a functional block diagram illustrating the logical and physical flows of data within the host in a USB system.

The USB provides means for communications between client software running on the host and functions provided by the USB devices. FIGS. 5 and 6 illustrate the flow of data which is communicated between the client software and the device functions. The figures show the host as comprising three components: the client software; the USB system software (including USB driver, host controller driver and host of software); and the USB host controller. The host controller driver interfaces the host controller with the USB system software, and the USB driver interfaces the USB system software with the client software. FIG. 5 shows that the USB device also comprises three components: the function; the logical device; and the USB bus interface.

While the logical flow of information between the client software and the function is direct, the figure shows that the actual flow of data goes from the client software to the USB system software, to the USB host controller, to the USB bus interface, to the USB logical device and finally to the function. Likewise, although the logical flow of control information from the USB system software to the USB logical device is direct, the actual flow of information must go through the host controller and the bus interface.

Figure 7:
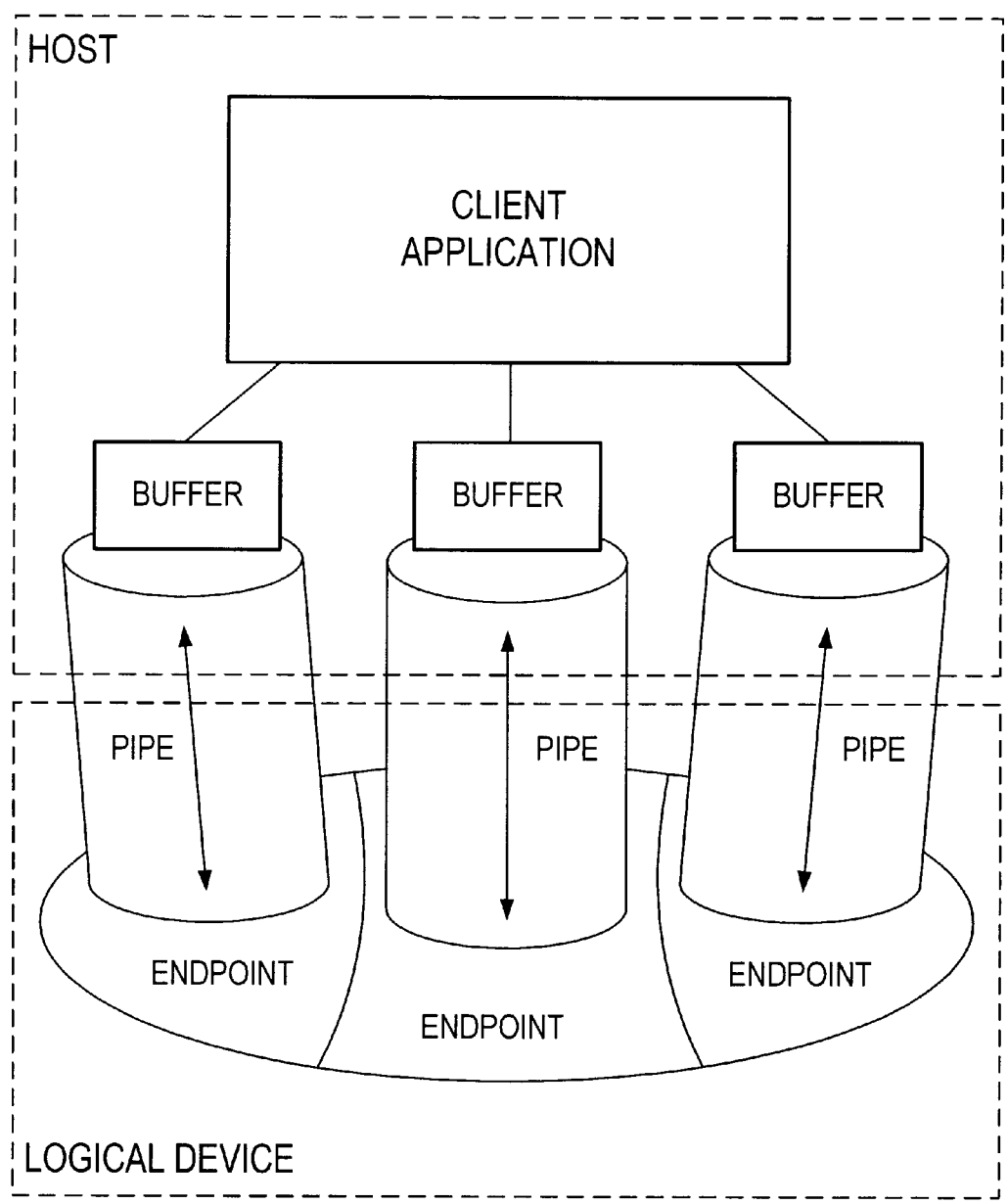
FIG. 7 is a diagram illustrating the flow of data between client software in the USB host and a plurality of endpoints in a USB device.

Referring to FIG. 7, a USB logical device is viewed by the USB system as an interface formed by a collection of endpoints. An endpoint is a uniquely identifiable portion of a USB device that forms the end of a communications path from the host to the device. Software may only communicate with a USB device via its endpoints. (The communications flow is illustrated in the figure by the arrows.) The number of each endpoint is determined by the designer of the device. The combination of a device address (assigned by the system at device attachment time) and the endpoint number allows each endpoint to be uniquely identified.

All USB devices are required to have an endpoint with number 0. This endpoint is used to initialize and manipulate (e.g., to configure) the logical device. Endpoint 0 provides access to the device's configuration information and allows access to the device for status and control purposes. Devices can have additional endpoints as required to implement their functions. Devices can have up to 16 additional input endpoints and 16 additional output endpoints (unless they are not full-speed devices, in which case they are limited to a reduced number of endpoints.).

The communications path between an endpoint on a device and software on the host is referred to as a pipe. A pipe comes into existence when a USB device is configured. Software clients normally request data transfers via I/O Request Packets (IRPs) to a pipe. The software clients then either wait or are notified when the requests are completed. Endpoint 0 has an associated pipe called the Default Pipe. The Default Pipe is used by system software to determine device identification and configuration requirements and to configure the device. The Default Pipe can also be used by device specific software after the device is configured, but the USB system software retains "ownership" of the Default Pipe and controls its use by client software.

Figure 8:
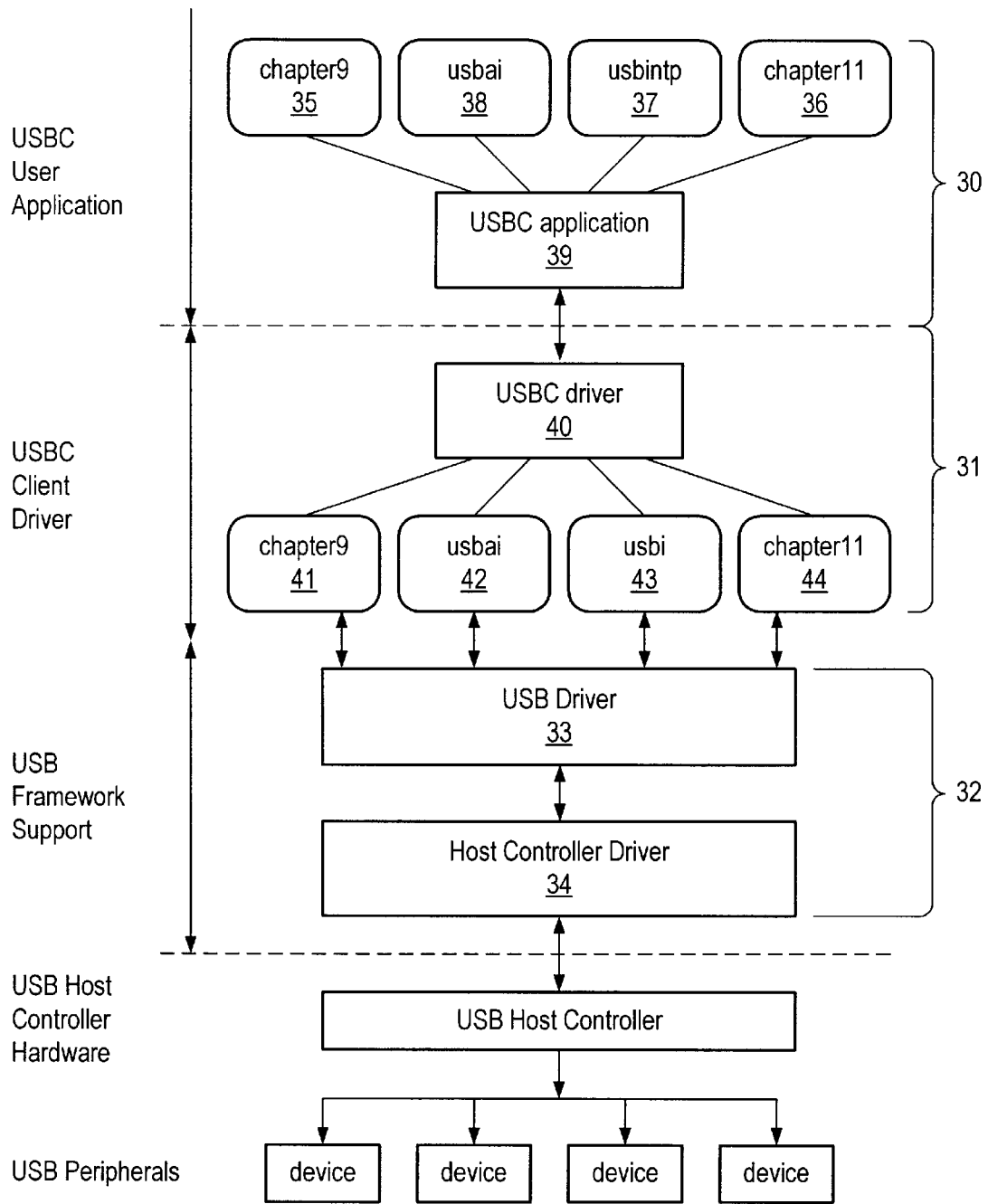
FIG. 8 is a diagram illustrating the structure of the USB test application in one embodiment of the invention.

Referring to FIG. 8, the software structure of one embodiment of the invention is shown. The client software in this embodiment comprises a test application 30 and a test application driver 31. The USB system software 32 comprises USB driver 33 and host control driver 34. The USB driver 33 and host control driver 34 are part of the USB Framework Support. The USB Framework Support is a Solaris☉ based implementation of the USB system software and includes a set of interfaces (USB Architecture Interfaces, or USBAI) which allow third party vendors to write USB client drivers on a Solaris☉ SPARC☉ platform.

Test application 30 includes modules configured to control testing of the different functions of the USB system. In this instance, the separation of the modules' capabilities generally conforms to the separation of USB functionalities defined in the USB Specification. For example, one module 35 controls the testing of standard device requests defined in Chapter 9 of the Specification, while another module 36 controls testing of hub standard requests as defined in Chapter 11 and another module 38 controls the testing of USBAI functions. Interpreter module 37 does not provide for the testing of a separate set of functions, but instead supports testing of all of the USB functions. These modules are all operatively coupled to the body 39 of the test application.

Test application driver 31 is similarly structured, having a main driver component 40 and several modules 41–44 which correspond to the modules of application 30. Test application driver 31 is a loadable driver. That is, when a USB device is hot-plugged, the USB architecture framework will load the driver and create a device node for the newly installed device. If the device is hot-unplugged, the driver will be unloaded as to the unplugged device.

The test application may be run on any USB device after it is installed. In one embodiment, the application, which is controlled primarily by the interpreter module, takes a device node as an argument, opens the device node and constructs state information for the device based on descriptor information obtained from the device. Test application driver 31 maintains the device state for use in testing the device. System test resources are allocated based on the constructed state information. The state information is also used as the basis of test requests which may be formulated by application 30. The test requests are forwarded to USBI module 43 of the test application driver 31, which decodes and validates the test parameters. If the test parameters are valid (i.e., within the allowable limits of the parameters,) the test application 30 and application driver 31 construct test cases using USBAI functions. The corresponding function calls are transmitted to the USB driver, which executes the functions. Test application driver 31 updates the state information for the device when the function calls are issued and notifies test application 30 of the pass/fail status of the tests after the test functions are performed. Test application 30 then notifies the user.

In one embodiment, the test application runs a suite of tests to verify all of the USBAI function calls. The application opens a device node, constructs state information for the device and allocates system resources based on the state information. The USBAI module 38 of the test application 30 formulates test requests and parameters based on the state information and conveys the test requests and parameters to the USBAI module 42 of the test application driver 31 for validation. After validating the test requests and parameters, the USBAI module of the test application driver formulates a series of test cases using the USBAI functions. The USBAI module of the test application driver then makes USBAI function calls corresponding to the test cases to the USB system software. The USBAI module of the test application driver returns a pass or fail indication to the test application after analyzing the results of the function calls. This same process is repeated for all of the endpoints in the selected USB device. The test application may spawn multiple threads to allow concurrent testing of the different endpoints. Some embodiments may also provide for concurrent testing of multiple USB devices.

In a similar manner, the test application may run a suite of tests to verify that a USB device can provide appropriate device information in response to all of the standard device requests defined in the USB Specification. The application again opens a device node, constructs state information for the device and allocates system resources based on the state information. All of the standard device requests are packaged in a request structure which is passed to the test application driver. The Chapter 9 module 41 of the test application driver 31 validates the commands in the request structure and then conveys the requests to the USB device via the Default Pipe. The information provided by the device in response to the standard device requests is then returned to the test application.

Different embodiments of the invention may include various features. One such feature is a command line mode. In command line mode, a user may input individual commands which are interpreted and executed by the application to test particular functions of the USB system. This can eliminate unnecessary testing which would be performed by a comprehensive suite of tests. Commands may, however, also be set up to execute a series of operations instead of a single operation.

The command line mode also allows the test application to be used remotely. In other words, the user does not have to be physically present to test the USB system. The user may instead establish communications with the test system and enter commands through the communications link. For example, the user may establish a modem connection between a remote computer and the test system and then enter commands via the modem connection. The link may utilize any suitable means for communicating, and the foregoing example of a modem-based link is intended to be illustrative rather than limiting.

The user may also execute commands which are unrelated to the test system (e.g., Unix shell commands) without having to interrupt the test session. The time normally required to start and terminate other test systems to perform non-system functions may therefore be avoided. The command line mode can be configured to alias the available commands to a unique list to reduce the amount of typing which is required. The test system can also be configured to provide online help to facilitate the user's interaction with the system.

One embodiment of the test system is configured with a functional mode in which the system can single-step through a USBAI function. This may be useful when the user needs to examine traffic on the USB. After a USBAI function command is issued, USB traffic may be examined using a logic analyzer as each step of the function is performed. This can be a valuable debugging feature.

Another feature which may be included is the capability of switching ports during testing. As mentioned above, the system is configured to perform device enumeration. That is, when there are multiple USB devices connected to the system, it can list all the connected devices and construct state information such as port number, device type, device class and path for each of the devices. The user can select the device at a particular port for certain tests and then switch to a different port and test the device connected to that port.

In addition to determining device information for the purpose of testing the devices, the test system may be configured to make this information available to the user. Information such as device descriptors can be displayed in a matrix format to enable the user to make side-by-side comparisons of the characteristics of individual devices. Because bus enumeration is an ongoing activity in the USB system, devices are recognized as they are connected to the USB and the information which is normally obtained on the devices can be displayed alongside information for previously installed devices. Likewise, information corresponding to devices which are removed from the USB system can be removed from the display.

In one embodiment, the commands which can be input to the test system can be grouped into four categories: commands relating to device state information; standard device request commands; USB architecture interface commands; and miscellaneous commands. Although a number of these commands are listed below, this list is not intended to be limiting. It is contemplated that the USB Specification may be amended to add, delete or modify the allowed commands to accommodate the changing functionality of the USB, and the test system may be adapted to include the new commands and functions of the USB.

The device state information commands are shown in Table 1 along with their corresponding functions. Device state information is tracked for the devices enumerated and identified by the test system. When an endpoint of a device is accessed, its state is updated in the test system.

TABLE 1

| | |
|---|---|
| Status | Lists port number, device class and device node name for all available devices. (Usually used after the "enumerate" command.) |
| Enumerate | Probes all available USB device nodes and creates device state information for each of the connected USB devices. |

TABLE 1-continued

| Device_state | |
|---|---|
| Port | Used to switch from a port at which one device is attached to another port at which a second device is connected. (The port numbers can be obtained from the "status" command.) |

The standard device requests are defined in Chapter 9 of the USB Specification. The standard device requests are shown in Table 2 along with their corresponding functions. All USB devices are required to respond to standard device requests from the host. These requests are made via the device's default pipe using control transfers. The request and the request's parameters are sent to the device in the setup packet.

TABLE 2

| | |
|---|---|
| Get_status | Used to obtain status for a device, interface or endpoint. Device status consists of a remote_wakeup value corresponding to either enable or disable. The returned status in the interface field must be zero. The returned status of an endpoint can be either stalled or not stalled. |
| clear_feature | Used to clear or disable two feature selectors: DEVICE_REMOTE_WAKEUP for the device; or ENDPOINT_STALL on a specific endpoint address. The endpoint address can be obtained from the "get_descriptor" or "device_state" commands. |
| set_feature | Used to set or enable two feature selectors: DEVICE_REMOTE_WAKEUP for the device; or ENDPOINT_STALL on a specific endpoint address. The endpoint address can be obtained from the "get_descriptor" or "device_state" commands. |
| set_address | Used only by system software. |
| get_descriptor | Used to return the descriptors for device, configuration, string or hub descriptors. All devices must provide a device descriptor and at least one configuration descriptor. The command returns the hub descriptor only in the device is in the hub class. |
| set_descriptor | USB devices usually do not support this command. The stall condition should be returned. |
| get_config | Returns the current configuration value. If the returned value is 0, the device is not configured. If the device is configured, a non--0 configuration value is returned. |
| set_config | Used to set the configuration value of the configuration descriptor. |
| get_interface | Used by the host to determine the currently selected alternate setting. |
| set_interface | Used by the host to set a selected alternate setting of an interface. |
| synch_frame | Used only for isochronous devices. This command should generate a stall condition. |

The USBAI commands are shown in Table 3 along with their corresponding functions. The USBAI commands are issued to a particular endpoint of a selected device. The USBAI functions corresponding to these commands can be executed in single-step mode in order to allow the user to examine traffic on the USB.

TABLE 3

| | |
|---|---|
| open_pipe | Used to open individual endpoints of USB devices. The open_pipe command takes an endpoint index as an argument for opening the pipe. The endpoint index can be obtained from the "device_state" command. |
| close_pipe | Used to close individual endpoints. This command takes an endpoint index as an argument for closing the pipe. The endpoint must be opened before it can be closed. The endpoint index can be obtained from the "device_state" command. |
| start_polling | This command applies only to an interrupt endpoint. It is invalid if the argument is a non-interrupt endpoint. Before an interrupt endpoint can be polled, it must be opened using the "open-pipe" command. The endpoint index can be obtained from the "device_state" command. Most USB devices need some hardware event to generate an interrupt packet after the endpoint is polled. |
| stop_polling | This command applies only to an interrupt endpoint. Polling must be started before it can be stopped. The endpoint index can be obtained from the "device_state" command. This command returns an error if the "start_polling" has not been executed on the endpoint. |
| set_policy | Sets the pipe policy. (Each pipe has a set of pipe policies. The policy allows the system software to change the behavior of the pipe.) The height must be opened using "open_pipe" before the policy can be set. The two policy fields which can be set by the user are pp_max_outstanding_request and pp_periodic_max_transfer_size. |
| get_policy | Used to read the pipe policy. The pipe must be opened using the "open_pipe" command before the policy can be read. |
| reset | Used to clear and released the associated resources allocated by the software. The pipe must be opened using the "open_pipe" command before the pipe can be reset. |
| clear_pipe | Used to perform a pipe_reset on the control endpoint. This command is usually used when there is a stall condition. |
| set_private | Used to set a private data area in the USB client driver. This command is used to verify the usb_pipe_set_private USB architecture interface function. |
| get_private | Used to obtain private data that was set in the USB client driver. The set_private command must be used before the get_private command. The get_private command returns an error if the pipe is not been opened or if the set_private command has not been executed. |
| reserve | Used to reserve a pipe of an endpoint index by calling usb_pipe_reserve in the USBI module of the USB client driver. The pipe of the endpoint must be opened before the pipe can be reserved. |
| release | Used to release a pipe of an endpoint index. This command calls usb_pipe_release. The pipe of an endpoint must be opened and reserved before the pipe can be released. |
| get_addr | Used to perform the usb_get_addr USB architecture interface call on an endpoint index. The pipe must be opened before this command can be used. |
| interface# | Used to perform the usb_get_interface_number USB architecture interface call on an endpoint index. The pipe must be opened before this command can be used. |
| get_dev_desc | Used to perform the usb_get_dev_desc USB architecture interface call on an endpoint index. The pipe must be opened before this command can be used. |

TABLE 3-continued

| | |
|---|---|
| raw_config | Used to perform the usb_get_raw_config USB architecture interface call on an endpoint index. The pipe must be opened before this command can be used. |

In addition to the foregoing commands, the test application provides for the following miscellaneous commands (see Table 4.)

TABLE 4

| | |
|---|---|
| help/? | Invokes the help utility of the test application. |
| quit/exit | Terminates the test application. |
| sizeof | Returns data structure size for device, configuration or endpoint descriptors. |

While the present invention has been described with reference to particular embodiments, it will be understood that the embodiments are illustrated and that the invention scope is not so limited. Any variations, modifications, additions and improvements to the embodiments described are possible. These variations, modifications, additions and improvements may fall within the scope of the invention as detailed within the following claims.

What is claimed is:

1. A test system for determining compliance of a universal serial bus (USB) system to a set of predetermined specifications comprising:
   a computer system wherein said computer system is configured to execute a test application and USB system software and wherein said computer system includes a host controller;
   a USB interconnect coupled to said computer system and configured to be controlled by said host controller;
   wherein said computer system is configured to accept test commands from a user, execution of each of said test commands being associated with a corresponding USB system operation, said operation being performed upon execution of said test command.

2. The test system of claim 1 wherein said computer system comprises a Unix operating environment, wherein said test application comprises a command line interpreter configured to accept said test commands via individually entered command lines and wherein said user may enter both Unix commands and said test commands, said test commands being executed by said test system and said Unix commands being executed by a Unix shell.

3. The test system of claim 1 wherein said test application is configured to perform a predetermined series of said operations in response to a user input.

4. The test system of claim 3 wherein said series of operations comprises a set of USB standard device requests.

5. The test system of claim 3 wherein said series of operations comprises a set of USB architecture functions.

6. The test system of claim 1 further comprising a communications link between said computer system and a remote location and wherein said test commands are entered into said computer system from said remote location via said communications link.

7. The test system of claim 6 wherein data generated as a result of execution of said test command is transmitted to said remote location via said communications link.

8. The test system of claim 1 further comprising one or more USB devices coupled to said USB interconnect.

9. The test system of claim 8 wherein said test application is configured to enumerate said one or more USB devices and to display data representative of said enumerated USB devices to said user, and wherein said test application is further configured to enable selection of one of said enumerated USB devices.

10. The test system of claim 8 wherein said test application is configured to enumerate said one or more USB devices and wherein said test commands are configured to designate a particular one of said USB devices for said operation.

11. The test system of claim 10 wherein each of said USB devices has one or more endpoints and wherein said test commands are configured to designate a particular one of said endpoints for said operation.

12. The test system of claim 8 wherein said test application and said USB system software are configured to recognize attachment of one or more additional USB devices to said USB interconnect and wherein said test application and said USB system software are configured to recognize removal of one or more of said USB devices to said USB interconnect.

13. The test system of claim 8 wherein said test application is configured to store state information associated with at least one of said USB devices.

14. The test system of claim 8 wherein said test application is configured to establish one or more pipes between said test application and one or more corresponding endpoints in said USB devices.

15. The test system of claim 1 wherein said USB system operation is a multi-step function and wherein said test system is configured to execute said USB system operation in a single-step mode.

16. The test system of claim 15 further comprising a logic analyzer coupled to said USB interconnect, said logic analyzer being configured to generate data indicative of signal traffic on said USB during execution of said USB system operation.

17. A method for testing a function of a universal serial bus (USB) system of a computer, said USB system having a USB interconnect, one or more USB interfaces and one or more USB devices, the method comprising:
   entering a test command on said computer;
   interpreting said test command using a command line interpreter;
   executing an operation associated with said test command;
   transmitting a test signal to said USB system; and
   validating a test result generated by said USB system in response to said test signal.

18. The method of claim 17 wherein said operation is a USB interface function and wherein said test signal is transmitted to one of said USB interfaces of said USB system.

19. The method of claim 17 wherein said operation is a standard device request and wherein said test signal is transmitted to one of said one or more USB devices of said USB system.

20. The method of claim 17 wherein said computer system is coupled to a remote location via a communications link and wherein entering said test command comprises entering said test command at said remote location and transmitting said test command over said communications link to said computer system.

21. The method of claim 17 further comprising entering a shell command on said computer and executing said shell command in an operating system shell running on said computer.

22. The method of claim 17 wherein executing said operation occurs in a single-step mode.

23. A method for testing a universal serial bus (USB) system, the USB system including a host computer system, a USB interconnect coupled to the host computer system and one or more USB devices coupled to the USB interconnect, the method comprising:

creating a node corresponding to one of said one or more USB devices;

opening said node;

obtaining state information for said one of said one or more USB devices;

storing said state information;

executing one or more tests based on said state information, each of said one or more tests corresponding to a particular function of said USB system; and validating the results of said one or more tests.

24. The method of claim 23 wherein creating said node comprises enumerating said USB system to identify said one or more USB devices and creating nodes for said devices.

25. The method of claim 24 wherein obtaining state information for said one of said one or more USB devices comprises requesting one or more descriptors from said one of said one or more USB devices.

26. The method of claim 25 wherein said tests comprise tests of USBAI functions.

27. The method of claim 26 wherein said tests further comprise tests of standard device request functions.

28. The method of claim 25 wherein said tests correspond to one or more command lines entered by a user and interpreted by a command line interpreter.

29. The method of claim 28 wherein entering said command lines further comprises transmitting said command lines to said computer system from a remote location.

* * * * *